United States Patent [19]
Yamini et al.

[11] Patent Number: 5,331,946
[45] Date of Patent: Jul. 26, 1994

[54] APPARATUS AND METHOD FOR SEALING AN OPENING IN A FIRE PARTITION THROUGH WHICH A COMBUSTIBLE CONDUIT EXTENDS

[76] Inventors: Khashayar Yamini, 725 Montroyal Boulevard, North Vancouver, British Columbia, V7R 2G4; Paul R. Bailey, 9020 Dixon Ave., Richmond, British Columbia, Canada, V6Y 1E4; Al Redl, 1403 - 730 Spadina Crescent, Saskatoon, Saskatchewan, Canada, S7K 4H7; Edwin J. R. Bailey, Scott Point, Wakaw, Sasakatchewan, Canada, S0K 4P0

[21] Appl. No.: 955,194

[22] Filed: Oct. 2, 1992

[51] Int. Cl.⁵ .................. F23J 13/00; E04H 9/00; E04B 1/94
[52] U.S. Cl. .................. 126/314; 126/315; 126/317; 52/1; 52/317
[58] Field of Search .................. 126/314, 315, 317; 52/317, 1

[56] References Cited

U.S. PATENT DOCUMENTS

| | | |
|---|---|---|
| 845,096 | 2/1907 | Kemble et al. ................ 126/317 |
| 1,518,816 | 12/1924 | Powell ................ 126/317 |
| 2,861,586 | 11/1958 | Dobbs ................ 137/360 |
| 3,036,814 | 5/1962 | Stevens ................ 251/299 |
| 3,046,976 | 7/1962 | Aggson ................ 126/316 |
| 3,462,890 | 8/1969 | Blumenkranz ................ 52/1 |
| 3,678,634 | 7/1972 | Wise et al. ................ 52/1 |
| 3,726,050 | 4/1973 | Wise et al. ................ 52/1 |
| 3,754,564 | 8/1973 | Naumburg et al. ................ 137/360 |
| 3,864,883 | 2/1975 | McMarlin ................ 52/221 |
| 4,109,423 | 8/1978 | Perrain ................ 52/1 |
| 4,136,707 | 1/1979 | Gaillot et al. ................ 137/75 |
| 4,221,092 | 9/1980 | Johnson ................ 52/232 |
| 4,307,546 | 12/1981 | Dolder ................ 52/1 |
| 4,419,535 | 12/1983 | O'Hara ................ 174/48 |
| 4,424,867 | 1/1984 | Mallow ................ 169/43 |
| 4,449,589 | 5/1984 | McCoy ................ 169/48 |
| 4,538,389 | 9/1985 | Heinen ................ 52/221 |
| 4,559,745 | 12/1985 | Wexler ................ 52/1 |
| 4,719,901 | 1/1988 | McLaughlin ................ 126/314 |
| 4,748,787 | 6/1988 | Harbeke ................ 52/741 |
| 4,796,401 | 1/1989 | Wexler ................ 52/232 |
| 4,894,966 | 1/1990 | Bailey et al. ................ 52/317 |

FOREIGN PATENT DOCUMENTS 2162251 12/1971 Fed. Rep. of Germany .

*Primary Examiner*—Larry Jones
*Attorney, Agent, or Firm*—Shlesinger Arkwright & Garvey

[57] ABSTRACT

An apparatus for sealing an opening, or the like, in a fire partition through which an existing combustible conduit extends includes a first enclosure capable of being fastened to the fire partition on one side of the conduit opening and having a first recess therein. A second non-combustible enclosure capable of being fastened to the fire partition on a side of the conduit opening opposite the first enclosure, has a second recess therein and is hingedly connected to the first non-combustible enclosure. The first and second enclosures lie in a common plane and are operable, through the use of the hinged connection, to be spread apart for installation over the existing combustible conduit and can be closed together such that a recess-formed opening is defined about the conduit by the first and second recesses. First and second shutter doors are slidable in the first and second enclosures respectively, the first and second shutter doors being slidable between a first, open position in which the recess-formed opening is unobstructed by the shutter doors and a second, closed position in which the recess-formed opening is obstructed by the shutter doors. The first and second shutter doors are urged into the closed position such that the recess-defined opening is obstructed when the combustible conduit is burned away.

19 Claims, 11 Drawing Sheets

APPARATUS AND METHOD FOR SEALING AN OPENING IN A FIRE PARTITION THROUGH WHICH A COMBUSTIBLE CONDUIT EXTENDS

BACKGROUND OF THE INVENTION

This invention relates to apparatus for preventing the progressive spread of fire by the progressive burning of a plastic article or assembly such as a pipe or conduit system and more particularly to apparatus which is adapted to seal the walls of a plastic pipe system to interrupt and baffle it when it softens in the presence of fire and before it ignites, to insure against the progressive burning of the pipe system through a fire-resistant wall, floor or partition.

With the increasing use of plastic pipes or conduits in buildings, many devices have been developed to seal off openings through which such pipes and conduits extend. One example of such a device is described and illustrated in U.S. Pat. No. 4,894,966, entitled Fire Stopping Apparatus. While the device described therein is practical for new conduit installations, it is not practically installable on existing conduit systems.

With the introduction of more stringent fire safety standards and the desire to install Fire Stopping Apparatus on existing conduit systems, a need has evolved for a Fire Stopping Apparatus which can be used on existing conduit systems.

SUMMARY OF THE INVENTION

In accordance with one aspect of the invention there is provided an apparatus for sealing an opening, or the like, in a fire partition through which an existing combustible conduit extends including a first non-combustible enclosure capable of being fastened to the fire partition on one side of the conduit opening and having a first recess therein. A second non-combustible enclosure capable of being fastened to the fire partition on a side of said conduit opening opposite said one side, has a second recess therein and is hingedly connected to the first non-combustible enclosure. The first and second enclosures lie in a common plane and are operable, through the use of the hinged connection, to be spread apart for installation over the existing combustible conduit and closed together such that a recess-formed opening is defined about the conduit by the first and second recesses. First and second shutter doors are slidable in the first and second enclosures respectively, the first and second shutter doors being slidable between a first open position in which the recess-formed opening is unobstructed by the shutter doors and a second closed position in which the recess-formed opening is obstructed by the shutter doors. The first and second shutter doors are urged into the closed position such that the recess-defined opening is obstructed when the combustible conduit is burned away.

The conduit extending through the opening may act to keep the first and second shutter doors from moving into the closed position. However, when the conduit is burned away, the opening is no longer obstructed by the conduit. Hence, the shutter doors close when unobstructed by the conduit. Fire is thus prevented from spreading through the opening in the fire partition through which the conduits extends since, upon burning of the conduit, the opening through which it extended is sealed by the apparatus.

The shutter doors may be kept open by a meltable member which is in the solid state at normal room temperature and which melts into a liquid state in a fire. In the solid state, the meltable member is in a restraining position and has sufficient rigidity to maintain the shutter doors in the open position. In the liquid state, the meltable member flows from the restraining position in which case the shutter doors are no longer restrained and the urging means acts on the shutter doors with sufficient power to close the shutter doors.

According to another aspect of the invention, the first and second shutter doors have respective cutting edges which act to cut through a burning or heat-softened conduit extending through the opening.

The first and second enclosures may be coated with an intumescent material which expands upon heating to provide a heat insulating layer about the first and second enclosures and which reduces the conduction of heat to the plate portions. Hence, transmission of heat to the fire partition in the area of the apparatus is reduce. As the apparatus is connected to only one side of the fire partition, no heat is transmitted by the apparatus to an opposite side of the fire partition.

According to another aspect of the invention the first and second enclosures have respective first and second edges and the first and second recesses are located in the first and second plate portions adjacent at least respective portions of the first and second edges to enable the apparatus to be used about a conduit located closely adjacent to a partition extending parallel to the conduit.

With the ability to effectively split the first and second enclosures apart in order to receive a conduit therebetween, the apparatus according to the present invention can be installed on existing conduit systems. In addition, the apparatus may easily be installed on new conduit installations where the apparatus may be either slid over the newly installed conduit or the apparatus may be spread apart and installed. Thus either mode of installation may be selected, to suit the preference of the installer.

BRIEF DESCRIPTION OF THE DRAWINGS

In drawings which illustrate embodiments of the invention.

DETAILED DESCRIPTION

Figure 1:
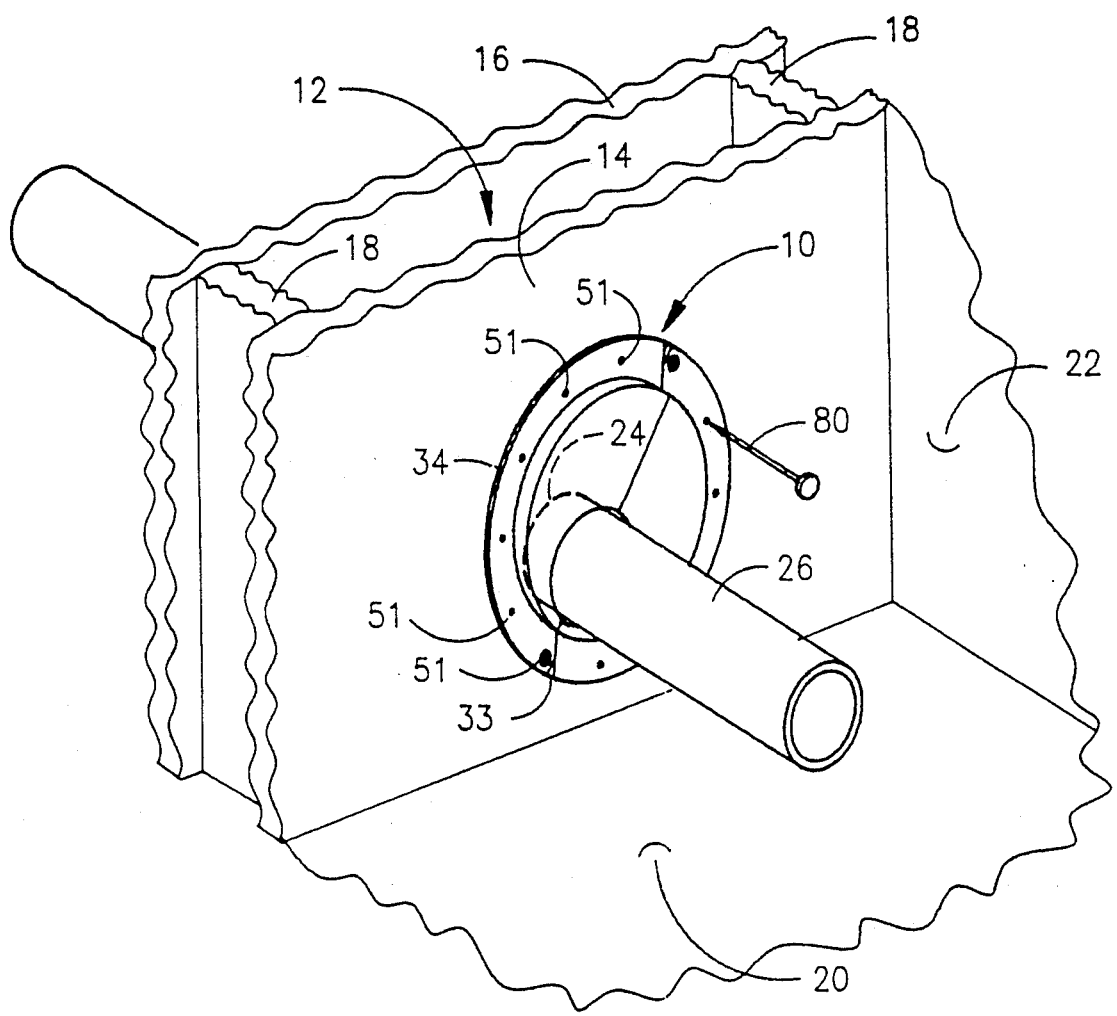
FIG. 1 is an oblique front view of an apparatus according to a first embodiment of the invention.

Referring to FIG. 1, an apparatus according to a first embodiment of the invention is shown generally at 10. The apparatus is shown mounted on a partition 12 having first and second opposite side walls 14 and 16 and studs 18, between the first and second opposite side walls. In the installation depicted, a floor 20 and a sidewall 22 are closely adjacent the partition 12.

The partition 12 has an opening 24 therethrough, the opening extending from the first side wall 14 through the second side wall 16. A plastic conduit 26 having a diameter of approximately 2½ inches extends through the partition 12 by extending through the opening 24. Of course, the apparatus can be used with conduits of virtually any diameter.

Figure 2:
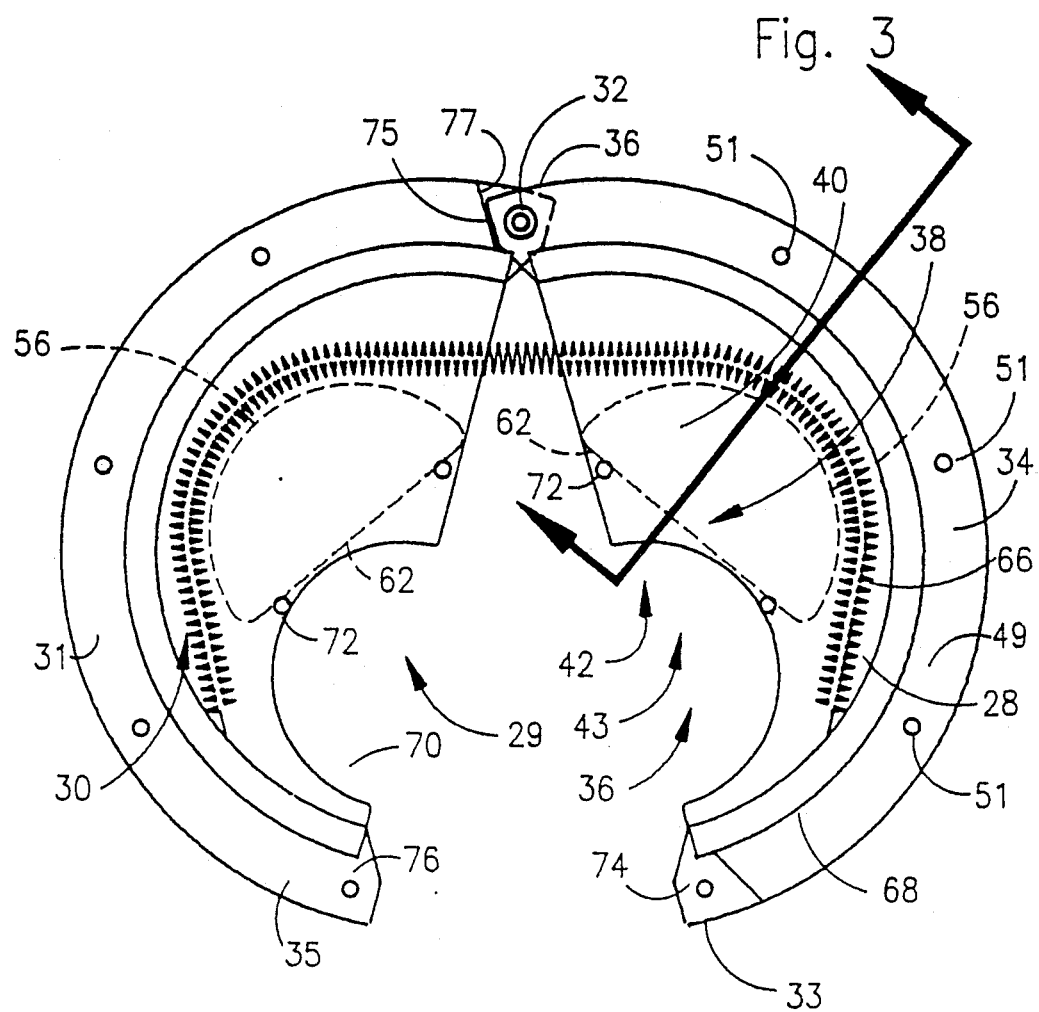
FIG. 2 is a front view of the apparatus shown in FIG. 1, shown in a position in which a combustible conduit may be received in first and second recesses according to the invention.

Referring to FIG. 2, the apparatus includes first and second enclosure portions 28 and 30 which are hingedly connected together by a hinge 32. In this embodiment, the first and second enclosure portions are generally semicircular in shape such that when the enclosure portions are closed together, a circular shape is formed as shown in FIG. 1.

Referring back to FIG. 2, the first and second enclosure portions 28 and 30 are virtually identical, the second enclosure portion 30 being a mirror image of the first enclosure portion 28. Therefore only the first enclosure portion 28 will be described, it being understood that the first and second enclosure portions are generally the same.

The first enclosure portion 28 includes a first semicircular rigid metal plate 34 formed from a sheet of 16 to 24 gauge sheet steel. Sheet steel is used because of its resistance to burning at normal temperatures associated with fire and is well suited for mounting to frame or masonry structures. The first metal plate is formed into a generally solid semicircular shape having flat planar face sides parallel to the plane of the drawing sheet and has a first semicircular recess 36.

To one of the face sides of the first metal plate 34 is secured a cover portion 38 having a semicircular planar portion 40 with a semicircular recess 42 formed therein. The other face side of the metal plate is left unobstructed to permit that face side to be mounted flush against a flat surface of a fire partition or against the framework of wood or metal studs in a frame wall. The semicircular recess 42 is aligned with the semicircular recess 36 in the first metal plate and recesses 36 and 42 collectively act as a first recess 43 of the first enclosure portion 28. The second enclosure portion 30 is similarly formed and has a second recess 29.

Figure 3:
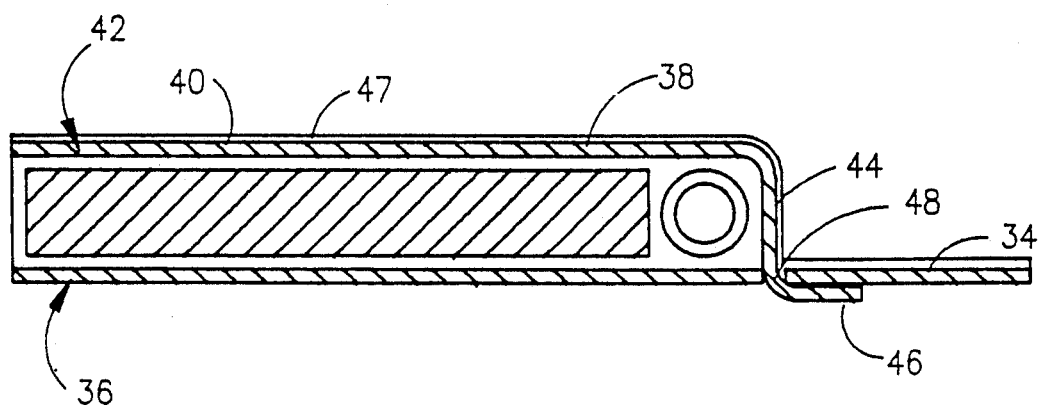
FIG. 3 is a cross sectional view taken along lines 3—3 of FIG. 2.

Referring to FIG. 3, the cover portion 38 has a right angled portion 44 which extends at right angles to the planar portion 40. At regular intervals, tabs are formed in the right angled portion, only one of which is shown at 46 in FIG. 3. The tabs are normally aligned with the right angled portion 44 and are operable to be inserted in slots 48 formed in the first metal plate 34. The tabs 46 are then bent over as shown in FIG. 3 to secure the cover portion 38 to the first metal plate 34.

The length of the tab portions 46 is chosen such that the cover portion 38 is well secured to the metal plate 34 when the tabs are bent over as shown. Preferably, the cover portion is secured to the plate portion such that a relatively narrow semicircular strip 49 of the metal plate 34 is left exposed to form an outer perimeter of the enclosure. The semicircular strip has a plurality of openings 51 therein for receiving nails or screws used to secure the apparatus to the fire partition.

The semicircular strip 49 has a mating portion 74 immediately adjacent the recess 43, which mates with a corresponding mating portion 76 on the second enclosure portion 30. Preferably, the first and second recesses are formed as close as possible to first and second outer edges 33 and 35 of the first and second metal plates respectively. It is preferable that the recess 43 is closely adjacent the mating portions as this permits the apparatus to be installed very close to an adjacent partition such as the floor 20 shown in FIG. 1. Clearly, the outer edge 33 of the first enclosure portion 28, near the mating portion 74, is closer to the recess 43 than the outer edge 36 near the hinge 32. Thus the distance between the nearest adjacent partition and the plastic conduit can be, at a minimum, equal to the distance between the outer edges 33 and 35 near the mating portions 74 and 76, and the recess 43. As this distance is relatively small, the apparatus is capable of retroactive installation on most conduit installations. Thus it can be said that first and second enclosures have respective first and second outer edges, and that the first and second recesses are located in the first and second enclosures respectively, closely adjacent respective portions of the first and second edges respectively to enable the apparatus to be used about a conduit located closely adjacent to a parallel partition.

Referring to FIG. 3, preferably, the cover portions 38, the right angled portions 44 and the semicircular strip 49 are coated with a layer of intumescent paint 47. Such paint expands upon the application of heat. In this embodiment the layer of intumescent paint 47 expands to provide a heat insulating layer over the extreme outer surfaces of the first and second enclosure portions.

Figure 4:
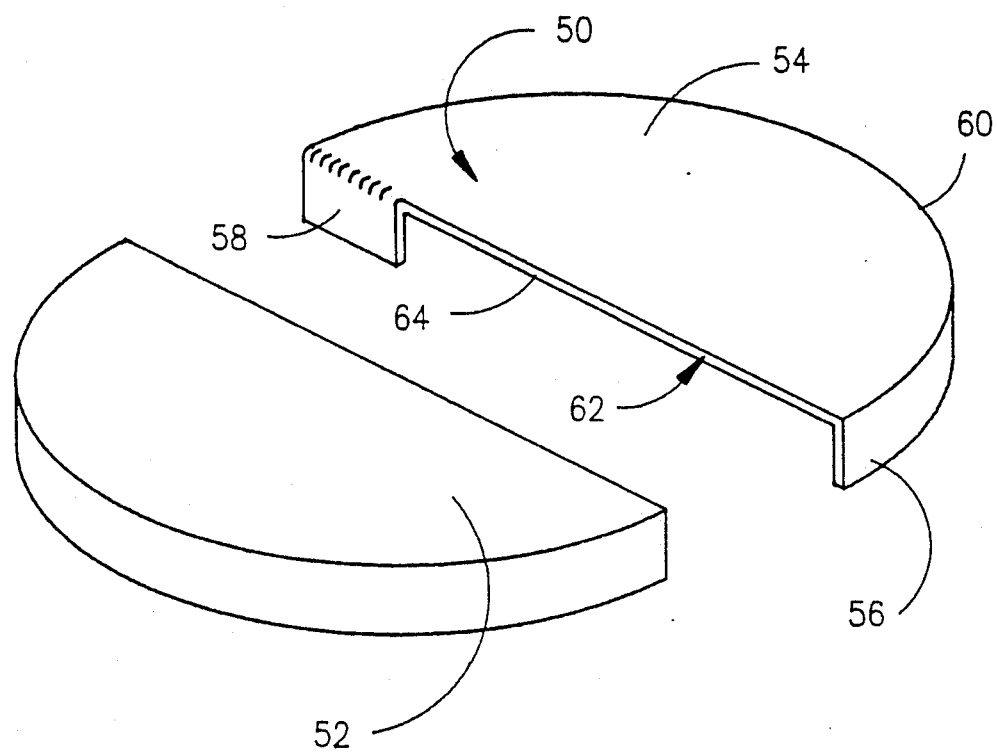
FIG. 4 is an oblique top view of first and second shutter doors according to the first embodiment of the invention.

Referring to FIG. 4 first and second shutter doors 50 and 52, formed from 16 to 24 gauge sheet metal are shown. Referring back to FIG. 3, in forming the cover portion, the length of the right angled portion at areas between tabs 46 is chosen to be sufficient to permit respective shutter doors 50 and 52 to be fully retracted into respective enclosure portions in the space between the cover portion 38 and the first metal plate 34. The metal plates and respective cover portions thus act to confine movement of the first and second shutter doors to a plane parallel to the metal plates of the first and second enclosures 28 and 30.

Referring back to FIG. 4, only the first shutter door 50 will be described, it being understood that the second shutter door 52 is similar to the first shutter door. The first shutter door 50 is formed from a single piece of 16 to 24 gauge sheet metal and has a semicircular planar portion 54, a right angled curved edge portion 56 and a right angled abutment portion 58. The semicircular portion 54 has a curved edge portion 60 which acts as an interface between the planar portion and the right angled curved portion 56 and has a straight edge portion 62 extending diametrically between opposite sides of the door. The straight edge portion has a sharpened cutting portion 64. The sharpened cutting portion is preferably formed when the edge is cut such as by a die. The first and second shutter doors thus have first and second cutting edges respectively for cutting the conduit transversely when it is softened by fire.

Referring back to FIG. 2, the first and second shutter doors 50 and 52 are received within the first and second enclosure portions 28 and 30 respectively. The doors are oriented such that the straight edges 62 of each door face towards respective recesses 43 in respective enclosure portions. A coil spring 66, having a first end portion 68 secured inside the first enclosure portion 28 and a second end portion 70 secured inside the second enclosure portion, is wrapped around the curved edge portions 56 of the shutter doors 50 and 52 such that the spring tends to urge the first and second shutter doors inwardly, towards each other. Preferably, the diameter of the coils of the spring is approximately equal to the width of the curved edge portion 56 of the shutter doors to prevent the spring from wedging between the shutter doors and the enclosure. In effect, the spring extending about the perimeter of the first and second shutter doors tends to draw the shutter doors together.

In the embodiment shown, the doors are held in the positions shown relative to the first and second enclosure portions respectively by relatively small portions of tin/lead solder 72 disposed in respective openings in the enclosure portions. The tin/lead ratio of the solder is chosen according to the desired temperature at which melting of the solder is desired to release the first and second shutter door 50 and 52.

Operation

Referring to FIG. 2, to install the apparatus on an existing plastic conduit, the first and second enclosure portions 28 and 30 are spread apart as shown in FIG. 2 such that the conduit (not shown in FIG. 2, but identified as item 26 in FIG. 1) can be received between the opposite mating portions 74 and 76 of respective enclosure portions. Spreading of the first and second enclosure portions 28 and 30 is limited by angular portions 75 and 77 formed in the first and second metal plates 34 adjacent the hinge 32.

Figure 5:
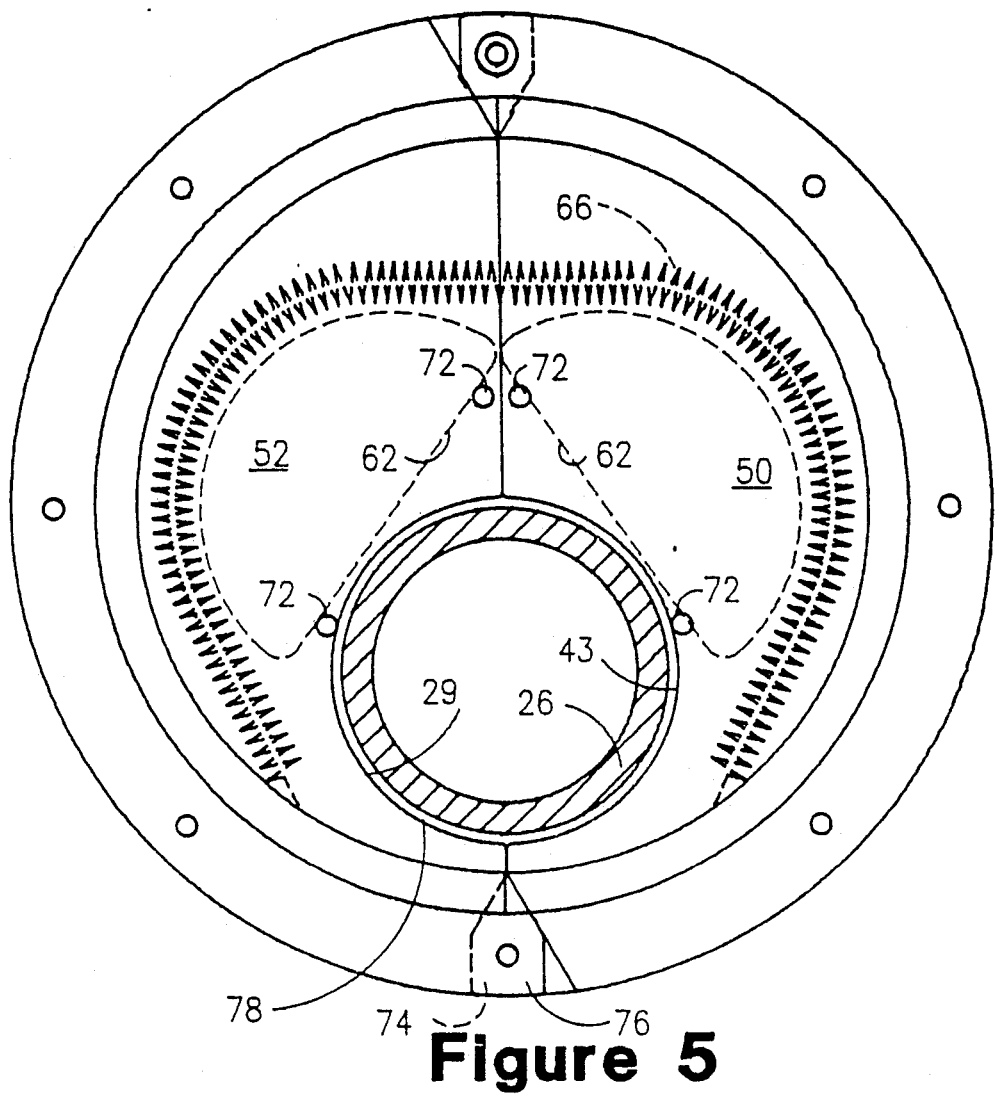
FIG. 5 is a front view of the apparatus shown in FIG. 1, with the combustible conduit extending through an opening formed by the first and second recesses and the first and second shutter doors shown held in an open position.

Referring to FIG. 5, when the conduit 26 is received between the opposite mating portions 74 and 76, the first and second enclosure portions are closed upon the conduit 26 such that the conduit is received snugly between the first and second recesses 43. The first and second recesses thus form a circular opening 78 through which the conduit 26 extends. In this position, the coil spring 66 urges the first and second shutter doors 50 and 52 together. The straight edges 62 of the first and second shutter doors may reset upon the outer walls of the conduit but preferably are restrained by the solder portions 72. The first and second shutter doors are thus held in a first, open position in which the recess-formed opening 78 is unobstructed by the shutter doors.

Referring to FIG. 1, the first and second enclosure portions may then be secured to the fire partition 12 by seating the face sides of the first and second metal plates (34) against the first side wall 14 and securing nails 80 into the sidewall 14, through openings 51. The respective face sides of the metal plates are thus mounted directly to an outer planar surface of the fire partition. The first and second enclosures thus act as first and second non-combustible enclosures capable of being fastened to the fire partition on opposite sides of the conduit opening. The first and second enclosures lie in a common plane and are pivotally connected together such that the first and second enclosures can be spread apart for installation over the existing conduit and closed together such that a recess-formed opening is defined about the conduit by the first and second recesses.

In the event of fire, at a temperature determined by the selected intumescent paint, the intumescent paint begins to expand to create an insulating layer over the apparatus. The insulating layer tends to impede the rate of heat transfer from the fire to the metal enclosure portions and thus the area around the opening 24 is effectively insulated by the apparatus. This reduces the probability of a fire involving the first sidewall 14 from igniting the plastic conduit 26. Thus, it can be said that the first and second enclosures each have a respective coating of intumescent material operable to expand upon the application of heat thereto such that the expanded intumescent material acts as a thermal insulator to prevent heat from being transmitted through the first and second enclosures to the fire partition.

Referring to FIG. 5, as the temperature of the apparatus increases in the fire, eventually the temperature of the metal enclosure portions will reach the melting point of the solder 72. At this time the solder melts, thereby permitting the first and second shutter doors to be urged by the spring 66 against the wall of the conduit. If the conduit has not yet softened due to the heat of the fire, the first and second shutter doors 50 and 52 are retained in the position shown in FIG. 5, by the conduit 26.

Figure 6:
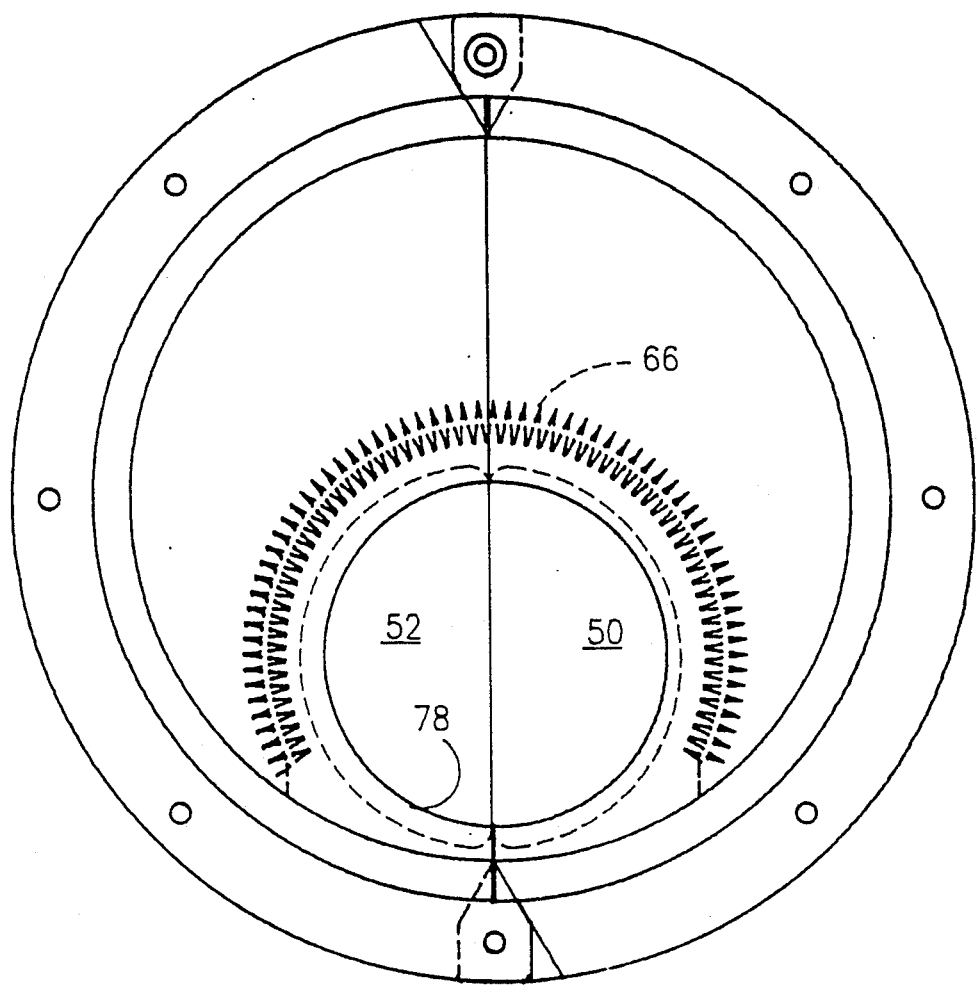
FIG. 6 is a front view of the apparatus shown in FIG. 1, with the first and second shutter doors in a closed position in which the opening is obstructed by the doors, the conduit having been burned away from the opening.

When the conduit begins to burn away, the conduit becomes soft and somewhat pliable, at which time the rigidity of the conduit succumbs to the force of the spring 66 and the first and second shutter doors 50 and 52 are urged inwardly, towards each other thereby shearing the plastic conduit 26 and closing the recess-formed opening 78 as shown in FIG. 6. The first and second shutter doors are thus slidable in the first and second enclosures respectively, into a second, closed position in which the recess-formed opening 78 is obstructed by the shutter doors. The spring 66 thus acts as urging means for urging the first and second shutter doors into the closed position when the combustible conduit is burned away due to fire.

As it can be expected that the plastic conduit 26 will soften before it burns, it is expected that the shutter doors 50 and 52 will close before any burning portion of the plastic conduit reaches the apparatus. Even if fire enters the stud space via the opening in the apparatus, once such space has been entered, the shutter doors will close and the fire will be suffocated. The spread of fire through the partition 12 is thus prevented.

Briefly stated, the method by which a conduit opening or the like, in a fire partition, may be sealed to prevent fire from propagating through the opening includes the steps of:

a) spreading apart first and second non-combustible hinge-connected enclosures containing first and second slidable shutter doors respectively;

b) closing the first and second enclosures such that first and second recesses respectively therein are operable to define a recess-defined opening through which the combustible conduit extends; and c) urging the first and second slidable shutter doors into a closed position in which the recess-defined opening is obstructed by the first and second shutter doors when the conduit is burned away from the opening due to heat from fire.

The cutting effect of the shutter doors is improved by using shutter doors which have cutting edges thereon for cutting through the conduit with the shutter doors when the conduit is softened due to heat from fire.

The method may be improved by insulating the first and second enclosures from heat by permitting intumescent material on the first and second enclosures to expand due to heat from the fire.

Alternatives

It has been stated that it is preferable to locate the recesses 43 and 29 as close as possible to the mating portions 74 and 76 as this enables the device to be used in installations where the plastic conduit is relatively close to an adjacent partition. It would however, be possible to locate the recess virtually anywhere between the mating portion 74 and the hinge 32, provided enough space is provided for full retraction of the shutter doors 50 and 52. It is expected however, that the embodiment described above will make the most efficient use of material.

In the embodiment described above, the recesses 43 are shown as being semicircular. This shape is not absolutely necessary and it is expected that other shapes of recesses would function equally as well.

Referring to FIG. 3, in the embodiment described above, the method of connecting the cover portion 38 to the metal plate 34 includes tabs 46 on the cover portion which are pushed through slots 48 in the metal plate and bent over. A variety of other methods of fastening the cover portion to the metal plate would work equally as well. Such methods include omission of the tabs 46 and welding the cover portion 38 to the metal plate 34 plate or omission of the slots 48 but keeping the bent tabs 46 and spot welding the bent tabs to the metal plate.

In an alternative embodiment, the solder 72 used to retain the shutter doors in the open position, may be replaced with hot glue. Or, the solder may be replaced with pins (not shown) which extend through the cover portion and the metal plate and which may be removed from the enclosures after the housings have been secured around a plastic conduit. Alternatively, meltable plastic pins or meltable retainers such as wire ties may be used to keep the shutter doors open.

Figure 7:
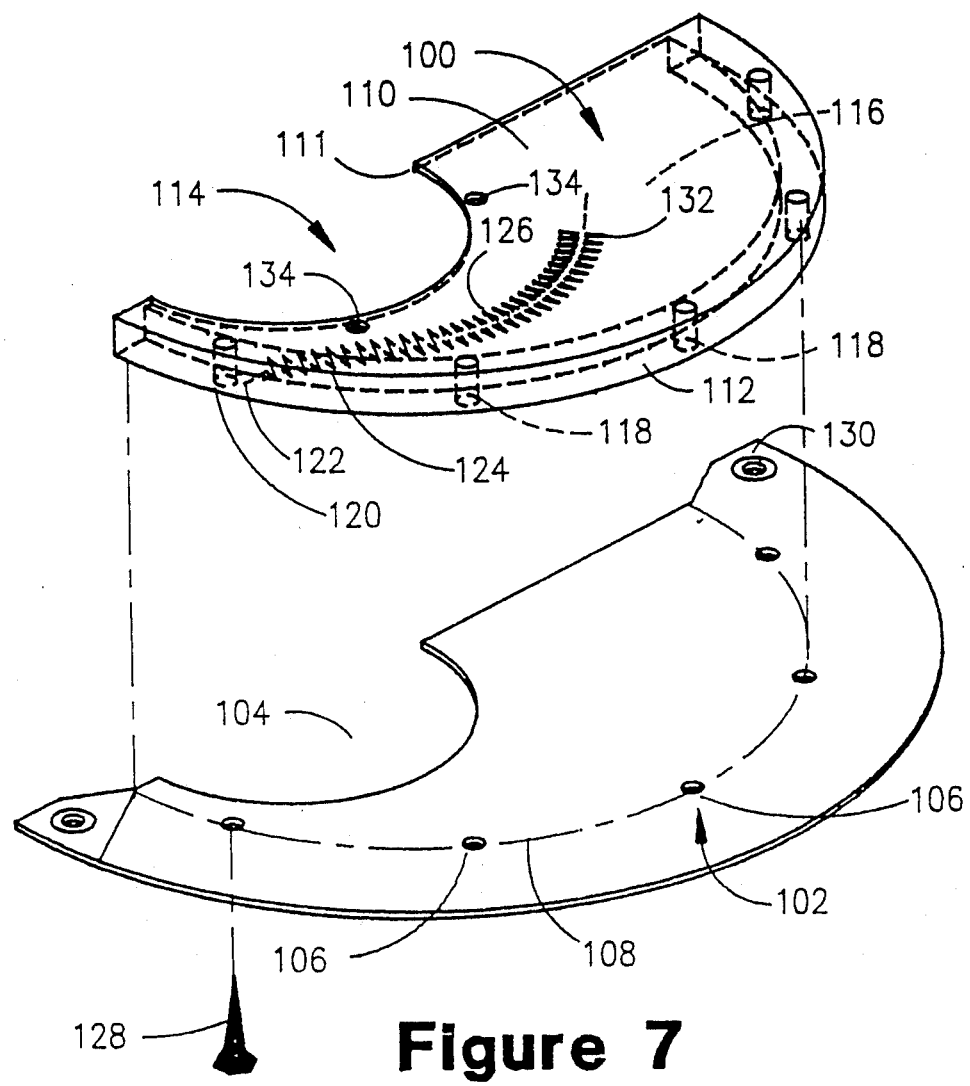
FIG. 7 is an exploded view of an enclosure according to a second embodiment of the invention.

Referring to FIG. 7, in a second embodiment, the cover portion of the first enclosure is replaced with a ceramic cover portion 100 and a different first metal plate 102 is used. In this embodiment, the first metal plate 102 is simply semicircular in shape with a recess 104 formed therein. The plate also has a plurality of openings 106 therein, the openings lying on a semicircular arc 108 concentric with the centre of the metal plate 102.

The cover portion 100 is formed from a sand/cement combination of the type normally used in making fire bricks. The cover portion has a planar portion 110, a straight edge portion 111 and a right angled arcuate wall portion 112. A recess 114 is formed in the planar portion, in a position such that when the cover portion is placed on the metal portion, the recesses 104 and 114 are aligned. The wall portion 112 spaces the cover portion off of the metal plate thereby creating a space 116 between the cover portion and the metal plate. The cover portion and metal plate are spaced such that the shutter doors shown in FIG. 4 are freely slidable and can be fully retracted therein.

During forming of the cover portion 100, the wall portion 112 is fitted with inside threaded studs 118 which are used in securing the cover portion to the metal plate 102 when the enclosure is assembled. The studs 118 are placed in positions such that when the cover portion 100 is placed on the metal plate 102, the studs 118 are aligned with the openings 106 in the metal plate. Preferably, the stud 120 immediately adjacent the recess 114 is fitted with a hook 122 which facilitates connection of a first end portion 124 of a spring 126 after the cover portion has been baked. After baking, the cover portion may be installed on the metal plate 102. This is done by inserting screws 128 through the openings 106. The screws are then securely tightened in the studs 118 to secure the cover portion to the metal plate.

Generally, the remaining aspects of the apparatus according to the second embodiment are similar to those of the first embodiment described above. This includes the shutter doors 50 and 52 shown in FIG. 4.

The first and second enclosures are joined together (not shown) by a hinge 130 on respective metal plates 102. Once the enclosures have been joined, outer end portions 132 of respective springs 126 may be joined together to create, effectively, a single spring similar to that shown in FIGS. 2, 5, and 6. With the springs 126 joined, the shutter doors (50 and 52) can be inserted into their respective enclosures and portions of solder 134 may be solidified in openings formed in the enclosure for receiving the solder. The solder 134 functions as described with respect to the first embodiment.

Optionally, the ceramic cover portion 100 and any exposed portions of the metal plate can be covered with a coating of intumescent paint to provide heat insulating properties as discussed in connection with the first embodiment.

Figure 8:
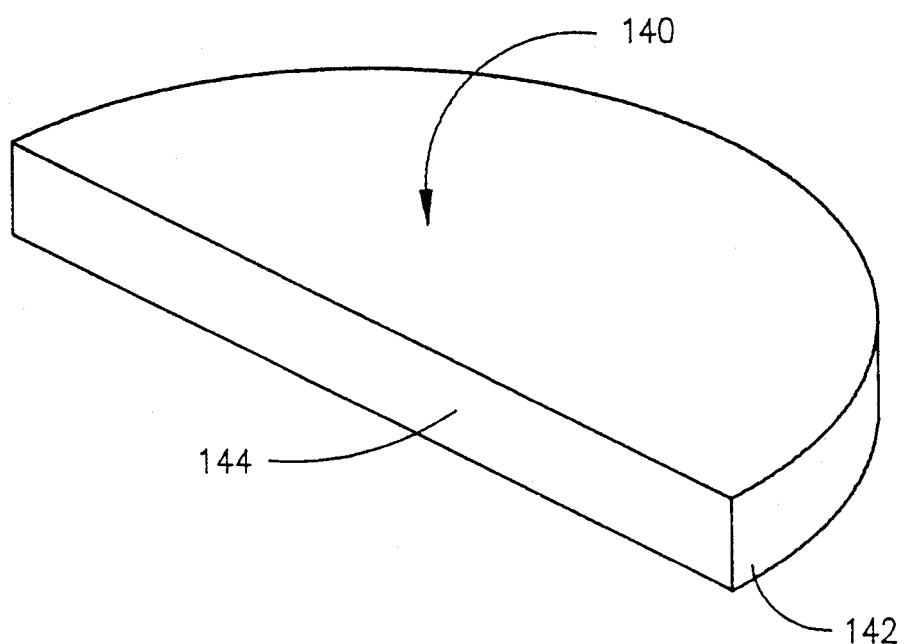
FIG. 8 is an oblique top view of a shutter door according to an alternative embodiment of the invention.

Referring to FIG. 8, in an alternative embodiment, the shutter doors (50 and 52 of FIG. 4) may be formed from ceramic material as single semicircular disks such as that shown generally at 140. This is particularly useful where the cover portions 100 are formed from ceramic material as described with reference to FIG. 7.

Figure 9:
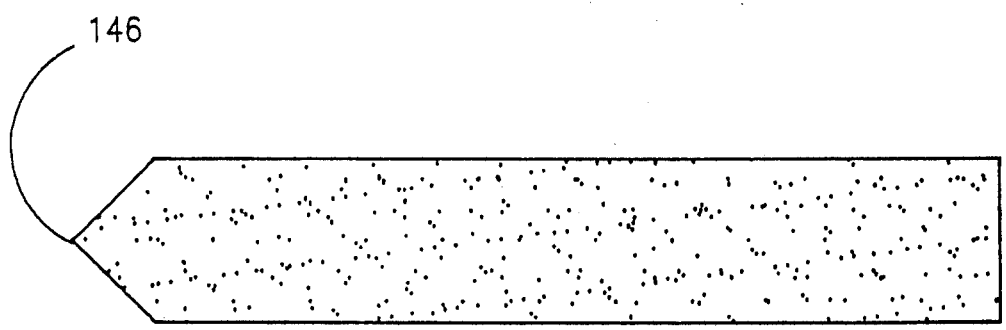
FIG. 9 is a cross sectional view of a pointed edge of a shutter door according to an alternative embodiment of the invention.

Referring to FIG. 8, the ceramic shutter door 140 is flat solid, planar in shape and has an arcuate curved edge portion 142 and a straight edge portion 144. Preferably, the straight edge portion 144 has a pointed edge 146 as shown in FIG. 9, as this aids in cutting through a softened plastic conduit when the shutter doors are released for closure.

Figure 10:
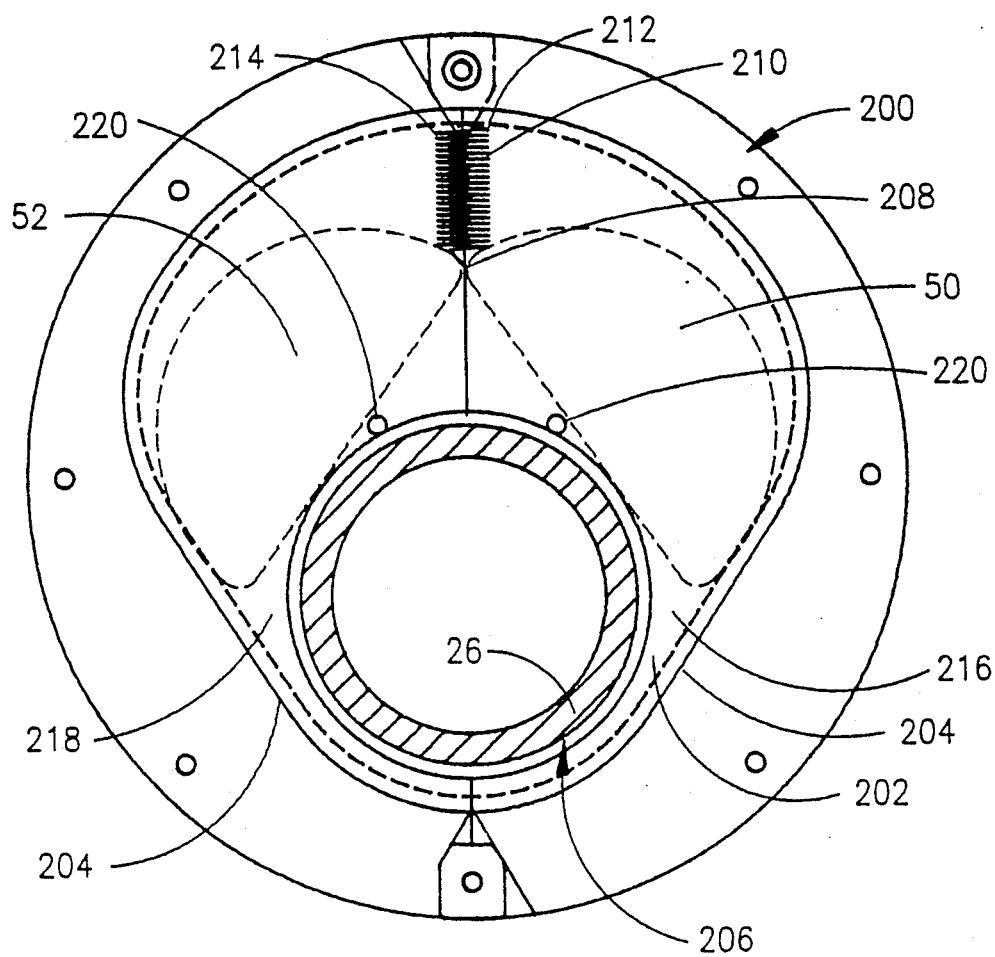
FIG. 10 is a front view of an apparatus according to a third embodiment of the invention, shown in an position in which shutter doors thereof are in an open position.

Referring to FIG. 10, a third embodiment of the invention is shown generally at 200. In this embodiment the shutter door and metal plates are generally as described in connection with the first embodiment and therefore these items are identified by the same numerical reference numbers as corresponding items in the first embodiment. Also in the third embodiment, the first and second enclosures are mirror images of each other and therefore only the first enclosure is described here, it being understood that the second enclosure is similar to the first enclosure.

The third embodiment differs from the first embodiment in that it has a cover portion 202 which is non-semicircular in shape. In particular, the cover portion has a tapered portion 204 near a recess 206 of the enclosure. In addition, the shutter doors 50 and 52 are hinged together by a hinge 208 and there is a spring 210 which acts between the hinge 208 and inside adjacent surfaces 212 and 214 of the first and second cover portions (202). In effect therefore, the spring acts between the shutter doors and the metal plates, tending to urge the shutter doors and relative to the metal plates. Retaining pins 220 are used to hold the shutter doors in position until the apparatus is installed. The retaining pins are removed after installation and the spring 210 tends to urge the shutter doors 50 and 52 into areas 216 and 218 between the conduit 26 and respective tapered portions 204. In this position, the shutter doors are in an open position in which the shutter doors are hinged outwardly.

Figure 11:
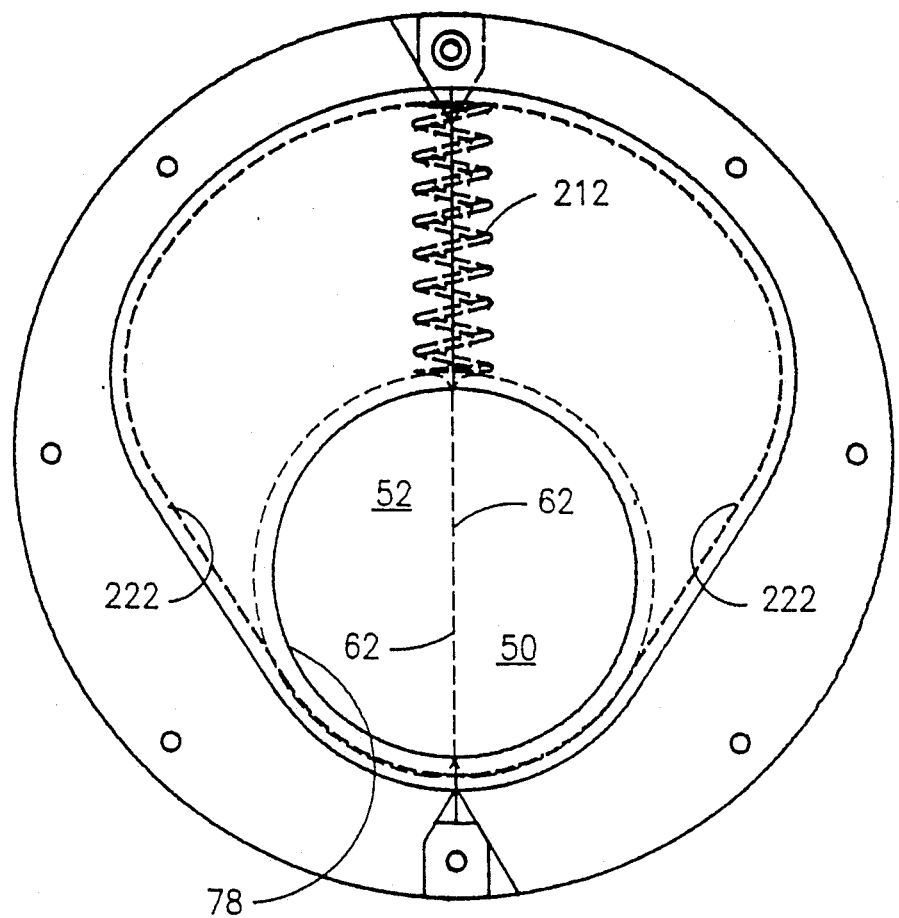
FIG. 11 is a front view of the apparatus of FIG. 10, shown with shutter doors thereof in a closed position.

Referring to FIG. 11, when the conduit has softened enough to succumb to the force of the shutter doors 50 and 52 urged against it, the spring 212 expands and pushes the doors along inside edges 222. Referring to FIG. 4, the curved edges 56 act as guiding edges on the shutter doors and the inside edges guide the doors into a closed position wherein the straight edges 62 of the shutter doors 50 and 52 are in abutment, in contact with each other, and the opening 78 is closed. The inside edges 222 of the tapered portions 204 thus act as first and second guide surfaces and, hence, as guide means on the first and second rigid plates respectively for guiding the movement of the first and second shutter doors respectively between the open and closed positions.

Each of the embodiments described above has the ability to effectively split the first and second enclosures apart in order to receive a conduit therebetween. Thus apparatus according to the present invention can be installed on existing conduit systems. In addition, the apparatus may easily be installed on new conduit installations where the apparatus may be either slid over the newly installed conduit or the apparatus may be spread apart and installed. Thus either mode of installation may be selected, to suit the preference of the installer.

While specific embodiments of the invention have been described and illustrated, such embodiment should be considered illustrative of the invention only and not as limiting the invention as construed in accordance with the accompanying claims.

What is claimed is:

1. An apparatus for sealing a conduit opening or the like in a fire partition wherein an existing combustible conduit extends through the conduit opening, the apparatus including:
   a) a first non-combustible enclosure capable of being fastened to the fire partition on one side of the conduit opening, and having a first recess therein;
   b) a second non-combustible enclosure capable of being fastened to the fire partition on a side of said conduit opening opposite said one side, the second non-combustible enclosure having a second recess therein, the first and second enclosures lying in a common plane and being pivotally connected together such that the first and second enclosures can be spread apart for installation over said existing conduit and closed together such that a recess-formed opening is defined about the conduit by the first and second recesses;
   c) first and second shutter doors slidable in the first and second enclosures respectively, the first and second shutter doors being slidable between a first, open position in which the recess-formed opening is unobstructed by the shutter doors and a second, closed position in which the recess-formed opening is obstructed by the shutter doors;
   d) urging means for urging the first and second shutter doors into the closed position when the combustible conduit is burned away due to fire.

2. An apparatus as claimed in claim 1 wherein the first and second enclosures each have a respective coating of intumescent material operable to expand upon the application of heat thereto such that the expanded intumescent material acts as a thermal insulator to prevent heat from being transmitted through the first and second enclosures to the fire partition.

3. An apparatus as claimed in claim 1 wherein the first and second enclosures have respective first and second outer edges, and wherein the first and second recesses are located in the first and second enclosures respectively, distal to the hinged connection of the first and second enclosures closely adjacent respective portions of the first and second edges respectively to enable the apparatus to be used about a conduit located closely adjacent to a parallel partition.

4. An apparatus as claimed in claim 1 wherein the first and second enclosures include first and second metal plates respectively, the first and second metal plates having respective face sides operable to be mounted directly to said fire partition.

5. An apparatus as claimed in claim 4 wherein the first and second enclosures include first and second metal cover portions respectively, for substantially covering the shutter door each cover portion having a respective planar portion parallel to and spaced apart from the first and second metal plates respectively, the shutter doors sliding in the space between respective plate portions and cover portions.

6. An apparatus as claimed in claim 4 wherein the first and second enclosures include first and second ceramic cover portions, each cover portion having a respective planar portion parallel to and spaced apart from the first and second metal plates respectively, the shutter doors sliding in the space between respective plate portions and cover portions.

7. An apparatus as claimed in claim 1 wherein the first and second shutter doors have first and second cutting edges respectively for cutting the conduit transversely when it is softened by fire.

8. An apparatus as claimed in claim 1 wherein the first and second shutter doors are semicircular in shape.

9. An apparatus as claimed in claim 1 wherein the urging means includes a spring extending about the perimeter of the first and second shutter doors such that the spring tends to draw the shutter doors together.

10. A method of sealing a conduit opening or the like in a fire partition wherein an existing combustible conduit extends through the conduit opening, the method including the steps of:
    a) spreading apart first and second non-combustible hinge-connected enclosures containing first and second slidable shutter doors respectively;
    b) closing the first and second enclosures such that first and second recesses respectively therein are operable to define a recess-defined opening through which the combustible conduit extends;
    c) urging the first and second slidable shutter doors into a closed position in which the recess-defined opening is obstructed by the first and second shutter doors when the conduit is burned away from the opening due to heat from fire.

11. A method as claimed in claim 10 further including the step of cutting through the conduit with the shutter doors when the conduit is softened due to heat from fire.

12. A method as claimed in claim 10 further including the step of insulating the first and second enclosures from heat by permitting intumescent material on said first and second enclosures to expand due to said heat.

13. An apparatus for sealing an opening in a fire partition wherein a combustible conduit extends through the opening, the apparatus including:
   a) a first non-combustible rigid plate portion having a first semicircular recess therein;
   b) a second non-combustible rigid plate portion having a second semicircular recess therein, the first and second plate portions lying in a common plane and being pivotally connected together such that the first and second semicircular recesses are operable to be aligned to define a circular opening, the semicircular recesses being dimensioned such that the conduit is snugly received therebetween;
   c) first and second shutter doors slidable relative to the first and second plates respectively between a first open position in which the circular opening is unobstructed by the shutter doors and a second closed position in which the circular opening is completely obstructed by the shutter doors;
   d) first and second guide means on the first and second rigid plates respectively for guiding the movement of the first and second shutter doors respectively between the open and closed positions;
   e) urging means for urging the first and second shutter doors into the closed position such that the first and second shutter doors move into the closed position when the combustible conduit is burned away.

14. An apparatus as claimed in claim 13 wherein the first and second rigid plate portions have first and second face sides respectively and wherein at least one of the face sides of each plate portion has a respective coating of intumescent material operable to expand upon the application of heat thereto such that the expanded intumescent material acts as a thermal insulator to prevent heat from being transmitted from one face side of the plate to the other.

15. An apparatus as claimed in claim 13 wherein the first and second rigid plate portions have respective first and second outer edges, and wherein the first and second semicircular recesses are located in the first and second plates respectively, distal to the hinged connection of the first and second plate portion adjacent at least respective portions of the first and second edges respectively to enable the apparatus to be used about a conduit located closely adjacent to a parallel partition.

16. An apparatus as claimed in claim 13 wherein the urging means includes a spring acting between the shutter doors and the plates.

17. An apparatus as claimed in claim 13 wherein the first and second shutter doors are hingedly connected together such that in the open position, the first and second doors are hinged outwardly and in the closed position, the first and second doors are hinged closed, in contact with each other.

18. An apparatus as claimed in claim 13 wherein the guide means includes first and second cover portions on the first and second plates respectively, the first and guiding cover portions having first and second guiding surfaces respectively, which bear upon the first and second shutter doors to direct the first and second shutter doors into the closed position and such that movement of the first and second shutter doors is confined to movement within a plane parallel to the first and second rigid plates.

19. An apparatus as claimed in claim 18 wherein the first and second shutter doors are semicircular in shape and have respective curved edges and respective straight edges, said curved edges contacting said guiding surfaces, and said straight edges contacting each other when the shutter doors are in the closed position.

* * * * *